United States Patent

[11] 3,585,615

[72] Inventors Kousuke Takahashi;
Hiroshi Murakami, both of Tokyo, Japan
[21] Appl. No. 836,461
[22] Filed June 25, 1969
[45] Patented June 15, 1971
[73] Assignee Nippon Electric Company, Limited
Tokyo, Japan
[32] Priority June 29, 1968
[33] Japan
[31] 43/45468

[54] ANALOG MEMORY APPARATUS
17 Claims, 8 Drawing Figs.

[52] U.S. Cl. .......... 340/174PW, 340/174 DA, 340/174 AN, 340/174 TF, 340/174 DC, 340/174 TL, 340/174 AD, 340/174 GA
[51] Int. Cl. .......... G11c 11/04, G11c 11/14
[50] Field of Search .......... 340/174 TF, 174 PW, 174 DA

[56] References Cited
UNITED STATES PATENTS

| | | | |
|---|---|---|---|
| 2,988,731 | 6/1961 | Kam Li | 340/174 |
| 3,438,016 | 4/1969 | Spain | 340/174 |
| 3,454,939 | 7/1969 | Michaelis | 340/174 |
| 3,500,353 | 3/1970 | Tohma et al. | 340/174 |

*Primary Examiner*—James W. Moffitt
*Attorney*—Marn and Jangarathis

ABSTRACT: Analog memory apparatus is provided in accordance with the teachings of the present invention wherein a thin film memory having row and column windings is adapted to have established therein, in response to a setting field, a magnetic domain whose axis of magnetization is opposite to the direction of magnetization of other domains therein. Once established, such reversely directed domain may be expanded under the influence of write-in pulses applied in the column direction in combination with pulses having a short repetitive period applied in the row direction in a timed relationship therewith. Readout pulses may be applied in the same direction as said write-in pulses whereupon nondestructive readout may be obtained in the column direction and signals are accordingly read out which correspond to the relative magnitude of the expanded, reversely directed domain.

Figure 1A:
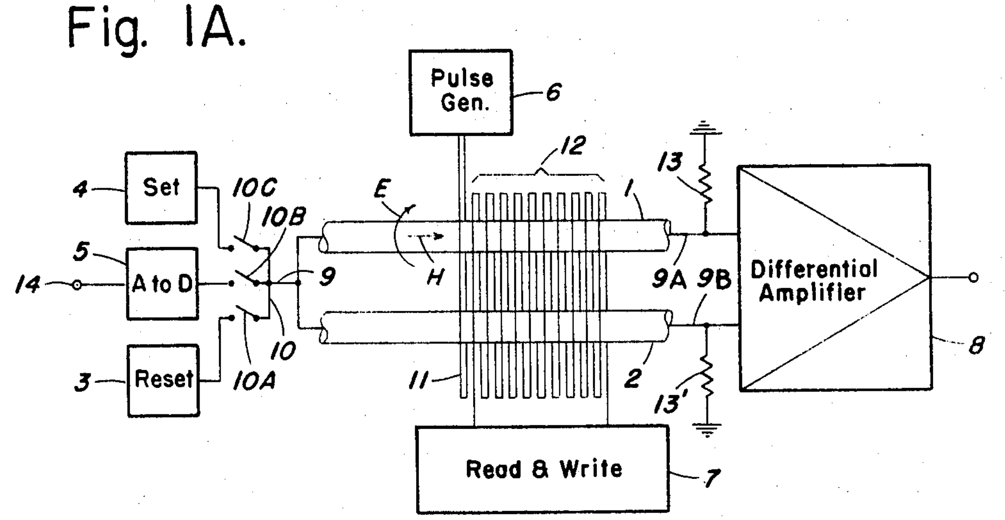

INVENTORS
Kousuke Takahashi
Hiroshi Murakami
BY
Marn & Jangarathis
ATTORNEYS

PATENTED JUN 15 1971 3,585,615

INVENTORS
Kousuke Takahashi
Hiroshi Murakami
BY
Marn & Jangarathis
ATTORNEYS

INVENTORS
Kousuke Takahashi
Hiroshi Murakami
BY
Marn & Jangarathis
ATTORNEYS

INVENTORS
Kousuke Takahashi
Hiroshi Murakami
BY
Marn & Jangarathis
ATTORNEYS

ANALOG MEMORY APPARATUS

This invention relates to magnetic memory apparatus and more particularly to thin film analog memory apparatus.

Although rapid advances have been recently made in the art of data processing and the techniques therefor, the wide commercial and industrial use of presently available data processing systems has rendered apparent the need for more efficient techniques for handling and processing large volumes of data which originate in the form of the human voice or characters. Thus, in cases where the data to be processed is complex and voluminous, presently available data processing systems are often found to be unable to expeditiously handle and process such data.

In order to overcome present, state of the art limitations in data handling and processing techniques, substantial research has been devoted to the analysis of the human voice and to pattern and character recognition. This research, particularly in the area of pattern recognition, has often been directed to subject matter dealing primarily with the manner in which input information is processed in the brain and tends to focus on the study of the neuron cell. As a result of such studies, a neuron model has been proposed and is presently being studied in substantial depth. Furthermore, pattern recognition apparatus employing such neuron model has been devised wherein the pattern recognition technique employed involves storing the corresponding relationship between the input pattern applied and the output signal derived through a so called learning scheme. The pattern recognition apparatus based on such neuron model is called a "Learning Machine" and as learning machines of this nature are generally described by F. Rosenblatt, in *Principles Of Neuro-dynamics, Perceptions And The Theory Of Brain Mechanism;* Spartan Books Inc., 1961; and also in the article by H. D. Block, B. W. Knight, Jr., F. Rosenblatt et al., published in "The Review Of Modern Physics," Volume 34, No. 1, 1962 at page 135 thereof; learning machines per se will not be further described herein.

Learning machines which have been developed to date generally rely upon magnetic memory apparatus which is usually analog in form to accomplish their critical storing and learning functions. The analog memory apparatus utilized should be operable at a proven accuracy to meet a specific requirement and be characterized by low level drive power requirements for both write-in and readout, extremely small size, low manufacturing and maintenance costs, high-speed writing and readout capabilities, nondestructive readout, and the capability of accessing at random. The analog memory apparatus presently available for use in learning machines may be classified into the categories descriptive of the variety of memory storage devices relied upon such as the so-called memistor which utilizes the electrical resistance of copper film, magnetic cores exhibiting a square hysteresis loop, multiaperture magnetic core devices such as transfluxers, and the ferrite toroids which store impedance as a function of microwave signals in a helically wound coil. However, none of these currently available forms of analog memory apparatus manifests each of the characteristics listed above while still exhibiting demonstrated accuracy to meet specific requirements. Thus, among such analog memory apparatus, those relying upon the memistor, as described in "A Survey Of Analog Memory Devices," published in the IEEE Transactions On EC, Aug. 1963, pps. 388—393, exhibit relatively slow write-in and readout speeds and are expensive and difficult to assemble in high density storage configurations. Similarly, the analog memory apparatus employing magnetic core devices having square hysteresis loops or those relying on multiaperture devices such as transfluxers, as described in "Components That Learn And How To Use Them," *Electronics*, Mar. 22, 1963, pps. 49—53, require highly complex writing configurations and thus are highly expensive to manufacture and to utilize in a high density storage configuration. In addition, since in analog memory apparatus employing magnetic core or multiaperature devices, it is necessary to utilize a complex negative feedback circuit in order to achieve the requisite accuracy, the cost of manufacturing such analog memory apparatus is further increased and the resulting analog storage apparatus is not operative when write-in and readout operations are carried out at low levels of drive power. In a like manner, analog memory apparatus using ferrite toroids, described in conjunction with a learning machine in U.S. Pat. No. 3,395,395, are difficult to employ in high density storage configurations, are expensive to manufacture due to the requirement for a microwave oscillator in the peripheral equipment therefor, and when such ferrite toroids are disposed in matrix arrays, unless the wiring thereof can be further improved, a good signal-to-noise ratio (S/N) can hardly be maintained. Thus, no presently available form of analog memory apparatus now possesses the requisite characteristics needed in learning machines based upon the neuron model form of pattern recognition apparatus.

Accordingly, it is an object of this invention to provide analog memory apparatus which utilizes thin film magnetic storage means.

An additional object of this invention is to provide thin film analog memory apparatus exhibiting demonstrable accuracy to meet specific requirements.

A further object of this invention is to provide thin film analog storage apparatus requiring only low levels of drive power for both write-in and readout.

An additional object of this invention is to provide thin film analog storage apparatus displaying high speed switching capabilities.

Other objects of the present invention will become apparent from the detailed description of several exemplary embodiments thereof which follow herein and the novel features of the present invention will be particularly pointed out in conjunction with the claims appended hereto.

Figure 1B:
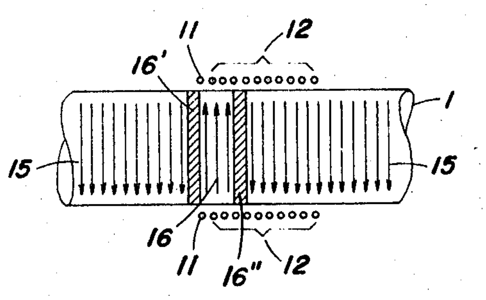
Figure 1C:
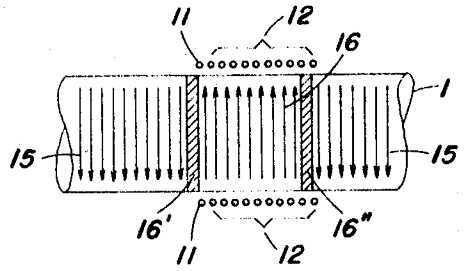
Figure 1D:
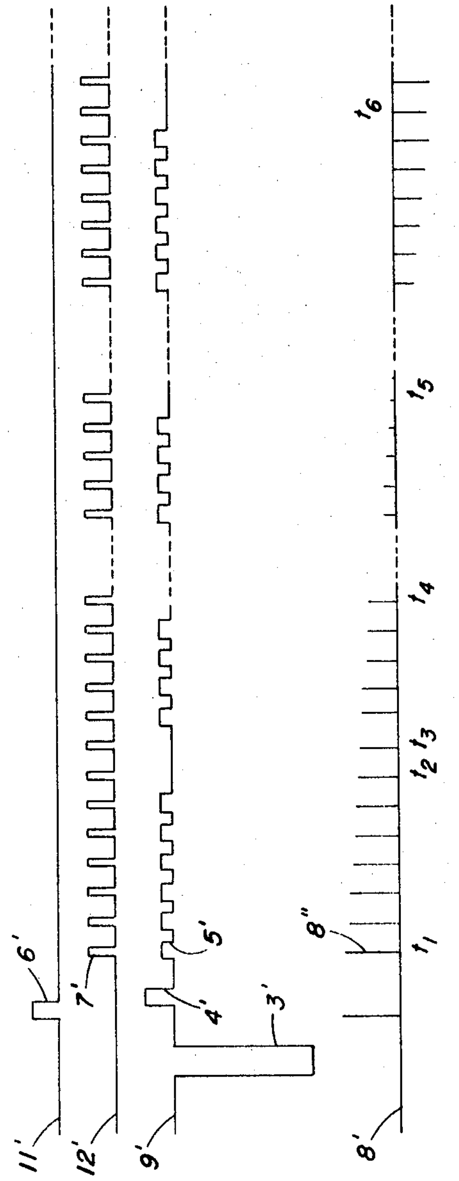
Figure 2A:
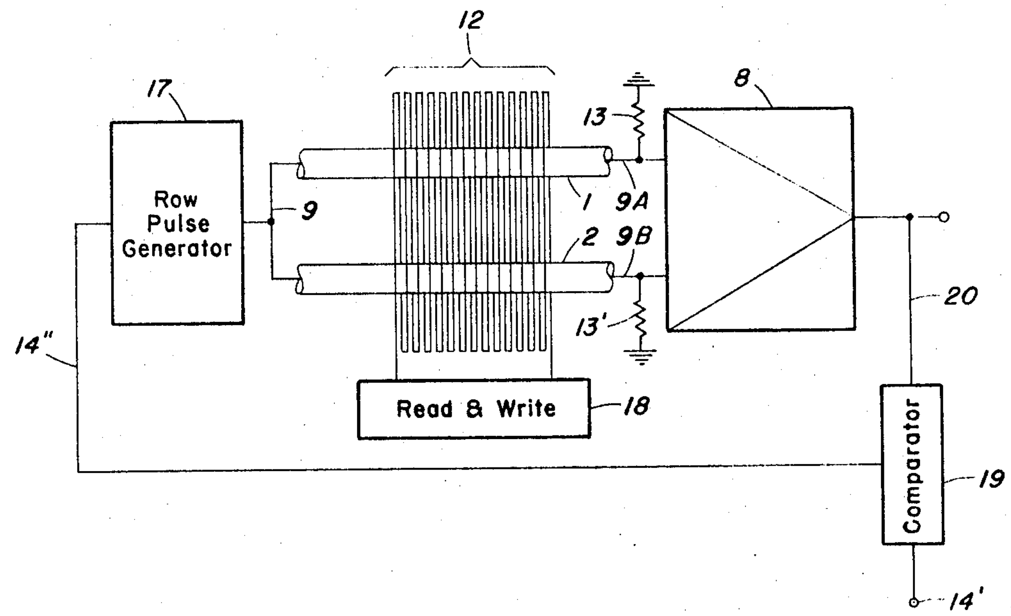
Figure 2B:
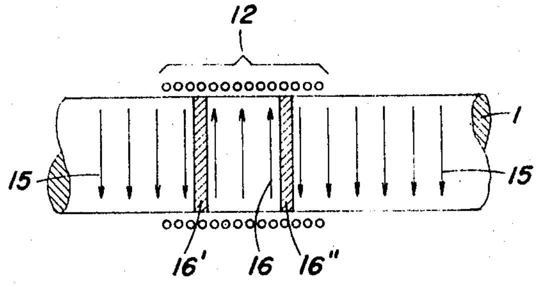
Figure 3A:
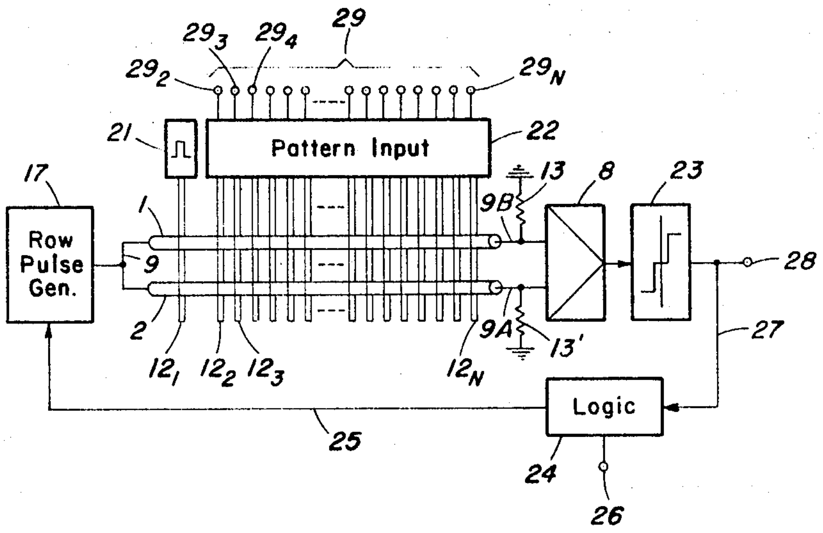
Figure 3B:
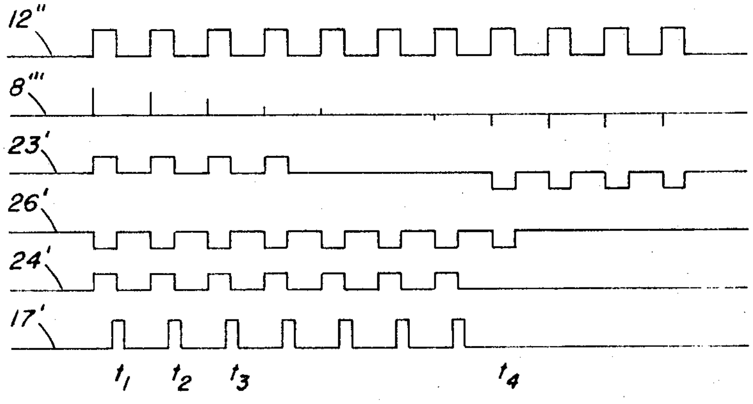

In accordance with the present invention, analog memory apparatus is provided wherein thin film memory means having row and column drive means associated therewith in an intersecting, magnetically linking relationship is adapted to have established therein, in response to a setting field, a magnetic domain whose axis of magnetization is opposite to the direction of magnetization of other domains therein; once established such reversely directed domain may be expanded under the influence of write-in pulses applied in the column direction in combination with pulses having a short repetitive period applied in the row direction in a timed relationship therewith; readout pulses may be applied in the same direction as said write-in pulses whereupon nondestructive readout may be obtained in the column direction and signals are thus read out which correspond to the relative magnitude of the expanded, reversely directed domain. The invention will be more clearly understood by reference to the following detailed description of several exemplary embodiments thereof in conjunction with the accompanying drawings, in which:

FIGS. 1A—1D show a first embodiment of the present invention wherein FIG. 1A schematically illustrates a first exemplary embodiment of the analog memory apparatus according to the present invention, FIGS. 1B and 1C are representative of the manner in which a reversely directed domain is established and expanded, and FIG. 1D illustrates the waveforms of pulses applied to and derived from the first embodiment of the present invention as well as the timed relationship therebetween;

FIGS. 2A and 2B illustrate another embodiment of the present invention wherein FIG. 2A schematically shows the embodiment of the analog memory apparatus according to the present invention and FIG. 2B indicates a reversely directed domain formed therein; and FIGS. 3A and 3B illustrate a further embodiment of the present invention wherein FIG. 3A is a schematic showing of such further embodiment per se and FIG. 3B is a pulse timing diagram illustrating a mode of operation of the exemplary embodiment of the invention illustrated in FIG. 3A.

Referring now to the drawings and more particularly to FIG. 1A thereof, there is shown a first exemplary embodiment of the analog storage apparatus according to the present invention. In addition, FIGS. 1B—1D, which illustrate conditions which are obtained in the instant embodiment of the present invention as well as the waveforms of current pulses applied thereto and derived therefrom, are provided to aid in the description of this embodiment of the present invention and accordingly will be referred to from time to time as the explanation thereof proceeds. As shown in FIG. 1A, the first embodiment of the analog storage apparatus according to the present invention comprises magnetic memory element means 1, nonmagnetic element means 2, row pulse generator means 3, 4 and 5, column pulse generator means 6 and 7 and differential amplifier means 8. The magnetic memory element means 1, as shown in FIG. 1A, may take the form of a conductive wire having a magnetic coating of uniaxial anisotropic thin film material thereon which exhibits a preferred direction or easy axis of magnetization in the circumferential direction of the coated conductor, as indicated by the arrow E, and a hard axis, indicated by the arrow H, in the axial direction. For example, the magnetic memory element means 1 may be formed of a phosphor-bronze conductive wire whose diameter is 0.13 mm. having an electrodeposited coating thereon of uniaxial anisotropic permalloy whose thickness is in the range of 5000A.—7000A. However, although the magnetic memory element means 1 has been shown herein in the form of a coated conductor, as will be obvious to those of ordinary skill in the art, the requisite thin film coating may be deposited on any suitable form or shape of substrate and any appropriate manner of deposition may be employed. The nonmagnetic element means 2 as shown in FIG. 1A, may take the same form as the core conductor utilized in the formation of magnetic memory element means 1; however, no thin film material is deposited thereon. The choice of the same conductor material for the nonmagnetic element means 2 and the magnetic memory element means 1 is here made so that both the magnetic memory element means 1 and the nonmagnetic element means 2 will display the same electrical characteristics. Thus, in the example given above, the nonmagnetic element means 2 may also take the form of a phosphor-bronze conductor whose diameter is 0.13 mm. The nonmagnetic element means 2 is present in the exemplary embodiment of the analog memory apparatus depicted in FIG. 1A so that equal electrostatic capacitive coupling will exist between each of the column conductors shown in FIG. 1A and both the magnetic memory element means 1 and the nonmagnetic element means 2 whereupon equal noise signals will be induced in each of the magnetic memory element means 1 and the nonmagnetic element means 2 and thereafter may be cancelled in the differential amplifier means 8. Thus, as shall be apparent to those of ordinary skill in the art, the nonmagnetic element means 2 only functions in the embodiment of the invention illustrated in FIG. 1A in a noise cancellation role and does not otherwise relate to the operation of the invention as disclosed herein.

The magnetic memory element means 1 and the nonmagnetic element means 2 are each commonly connected at their left end portions to the switching bank means 10 through the row conductor 9. The row conductor 9, as shown in FIG. 1A is divided into two parallel segments which connect respectively to the conductive core of the magnetic memory element means 1 and the nonmagnetic element means 2. The switching bank means 10 may take the form of any suitable switching means well known to those of ordinary skill in the art and capable of selectively closing one of the individual switch means 10A—10C present therein. Although the switch means 10A—10C present in the switching bank means 10 illustrated in FIG. 1A have been illustrated as manual switch devices to render their function apparent, it will be readily appreciated that the switching bank means 10 will ordinarily comprise electronic switching devices such as semiconductor means which are well known to those of ordinary skill in the art. The switch means 10A—10C present in the switching bank means 10 are each connected to one of the row pulse generator means 3—5, respectively, and accordingly serve to selectively couple said row pulse generator means 3—5 to the row conductor 9. The row pulse generator means 3 illustrated in FIG. 1A here acts, as indicated, to apply a reset pulse to the row conductor 9 and accordingly may take any of the forms of driver means generally used in computer applications which are capable of supplying a reset pulse to the row conductor 9 having a sufficient amplitude and duration to reset each of the domains therein to a selected orientation. The negative waveform of the reset pulse 3′ supplied by the row pulse generator means 3 is shown in FIG. 1D, which illustrates the waveforms and relative timing of the current pulses applied to and derived from the embodiment of the present invention shown in FIG. 1A. However, as will be apparent to those of ordinary skill in the art, although the reset pulse 3′ is shown as a negative pulse the polarity thereof may be positive if the polarity of the drive pulses supplied by the other pulse generator means described hereinafter are appropriately reversed. The row pulse generator means 4, as indicated in FIG. 1A, acts to apply a set pulse 4′, shown in FIG. 1D, to the row conductor 9 and thus may be similar in form to the reset pulse generator means 3 but adapted to apply an oppositely directed pulse having a smaller magnitude. The positive polarity set pulse 4′ supplied by the row pulse generator means 4 is illustrated in FIG. 1D and acts, as shall be seen below, in a timed relationship with a pulse applied in the column direction to establish a domain in the magnetic memory element means 1 having an opposite magnetic orientation to those resulting from an application of a reset pulse 3′ to the row conductor 9. The row pulse generator means 5 may take any of the well-known forms of analog to digital conversion devices which act in response to the application of an analog signal thereto to provide a plurality of digital pulses wherein the number of such digital pulses is proportional to the analog signal. The digital output current pulses 5′ provided by the row pulse generator means 5 are illustrated as positive pulses in FIG. 1D and as may be seen by an inspection thereof, such current pulses 5′ are positive pulses whose magnitude is smaller than that of either pulse 3′ or 4′.

The rightmost end portions of both the magnetic memory element means 1 and the nonmagnetic element means 2 are each connected through associated output portions 9A and 9B, respectively, of the row conductor 9 to first and second inputs of the differential amplifier means 8. The differential amplifier means 8 may take a conventional form of this well-known class of devices and may act in the usual manner to algebraically subtract, through a summing process carried out after a 180° phase reversal of one of the inputs applied, the inputs applied thereto and provide an output signal representative of the differences therebetween. In addition, the output portions 9A and 9B of the row conductor 9 are provided with the terminal resistances 13 and 13′, respectively, which are connected between the respective output portions 9A and 9B of the row conductor and ground. The terminal resistances 13 and 13′ are each selected to have a resistance value equal to the characteristic impedance of the magnetic memory element means 1, which for the thin film coated phosphor-bronze wire described above is about 100 Ω, and thus act in the well-known manner to improve the transmission characteristic of the output portions 9A and 9B of the row conductor 9.

The magnetic memory element means 1 and the nonmagnetic element means 2 are each provided, in the embodiment of the invention illustrated in FIG. 1A, with first and second column conductors 11 and 12 which are wound on each of said element means 1 and 2 in the same direction. The first column conductor 11 is illustrated in FIG. 1A as comprising only a single turn winding; however, as shall be apparent to those of ordinary skill in the art, the first column conductor 11 may comprise any convenient number of turns so long as it is clearly understood that said column conductor 11 is intended to link only a relatively narrow portion of the magnetic memory element means 1. Furthermore, the turns about the magnetic memory element means 1 and the nonmagnetic element means 2 should be the same so that equal coupling between each of said element means 1 and 2 and the first column conductor 11 will be established whereby equal noise will be induced in each of said element means 1 and 2 for subsequent cancellation in the differential amplifier means 8. The first column conductor 11 is connected to the column pulse generator means 6. The column pulse generator means 6 may take the form of conventional pulse driver means utilized in computer applications and is here adapted to apply a positive polarity current pulse 6′, as shown in FIG. 1D, to the first column conductor 11. The positive polarity current pulse 6′ is adapted to apply a field to the magnetic memory element means 1 which is transverse to the easy direction of magnetization and acts in combination, as will be seen below, with the setting pulse 4′ to establish an oppositely directed domain in the magnetic memory element means 1.

The second column conductor 12, as illustrated in FIG. 1A, includes a substantial number of turns about both the magnetic memory element means 1 and the nonmagnetic element means 2 so that said second column conductor 12 links substantial lengthwise portions of each of the magnetic memory and nonmagnetic element means 1 and 2 in the same direction. The linkage of equal portions of the magnetic memory and nonmagnetic element means 1 and 2 is again preferred so that equal noise will be induced therein and may be cancelled. The second column conductor means 12 is connected to the column pulse generator means 7 which may comprise conventional pulse generator or drive means. The column pulse generator means 7, as indicated in FIG. 1A functions to supply read and write pulses to the second column conductor means 12 and hence to the magnetic memory element means 1 wound thereby. The read and write pulses applied by the column pulse generator means 7 may take the form of the periodically applied, positive pulses 7′ which are illustrated in FIG. 1D. Such read and write pulses have a rather short duration and are of the same polarity regardless of whether a readout or write-in operation is being carried out; however, as shall be seen below, write-in may only be accomplished when both the column pulse generator means 7 and the row pulse generator means 5 are energized while the content of the magnetic memory element means is read out whenever the column pulse generator means 7 is energized.

The operation of the embodiment of the analog memory apparatus according to the present invention, as shown in FIG. 1A, will be explained in conjunction with the waveforms illustrated in FIG. 1D while the effect of certain of the pulses applied to the magnetic memory element means 1 is represented in FIGS. 1B and 1C. If it is initially assumed that the analog memory apparatus depicted in FIG. 1A has information previously stored present therein, prior to the initiation of a new cycle of operation the magnetic memory element means 1 must be cleared so that new information may be written therein. This is accomplished by the closure of switch means 10A of the switching bank means 10 so that the row pulse generator means 3 is operatively connected to the row conductor 9. With the switch means 10A in a closed condition and the remainder of the switch means 10B and 10C present in the switching bank means 10 in an open condition, the row pulse generator means 3 will apply a reset pulse 3′ to the row conductor 9. As shown in FIG. 1D, the reset pulse 3′ applied to the row conductor 9 under these conditions comprises a negative pulse whose amplitude and duration are sufficient to place each of the magnetic domains present in the magnetic memory element means 1 in the direction of the field generated thereby. Thus, if the usual vector representation is adopted for the magnetic domains present in the magnetic memory element means 1 and the back portion of said magnetic memory element means 1 is considered, the application of the reset pulse 3′ to the row conductor 9 by the row pulse generator means 3 will place each of the magnetic domains present in the magnetic memory element means 1 in the downward direction indicated by the vectors 15 illustrated in FIGS. 1B and 1C.

After the magnetic memory element means 1 has thus been placed in the cleared or reset state by the row pulse generator means 3, a writing operation is initiated by establishing a stable domain in the magnetic memory element means 1 which is reversely oriented with respect to the remainder of the domains present therein whose orientation was previously determined by the reset pulse 3′. The requisite reversely oriented domain is established in the magnetic memory element means 1 under the control of the row pulse generator means 4 and the column pulse generator means 6. Thus, such reversely oriented domain may be established in the magnetic memory element means 1 by the energization of the column pulse generator means 6 and the closure of switch means 10C of the switching bank means 10 while the switch means 10A and 10B therein are in an open condition. When the column pulse generator means 6 is energized and the switch means 10C is closed, in an appropriate timed relationship, the column pulse generator means 6 will apply the current pulse 6′, illustrated in FIG. 1D, to the first column conductor 11 and row pulse generator means 4 will apply a set pulse 4′, as shown in FIG. 1D, to the row conductor 9. The current pulse 6′ and the set pulse 4′ are positive current pulses whose magnitude and duration are individually insufficient to establish a reversely oriented domain in the magnetic memory element means 1 but are sufficient when acting in combination to establish such reversely oriented domain in the portion of the magnetic memory element means 1 influenced thereby. The pulses 6′ and 4′, as shown in FIG. 1D, are each applied coincidentally or in partial coincidence to the first column conductor 11 and the row conductor 9 and hence, the portion of the magnetic memory element means 1 linked by both the first column conductor 11 and the row conductor 9 will have established therein, in the well-known manner, a stable domain whose orientation is opposite to that of the remainder of the domains present in the magnetic memory element means 1. The domain formed by the coincident application of pulses 6′ and 4′ is generally indicated in FIG. 1B wherein the vectors annotated 16 represent the domain formed in the portion of the magnetic memory element means 1 linked by the row and first column conductors 9 and 11, the sectioned areas 16′ and 16″ represent the domain walls formed thereby and the first and second column conductors 11 and 12 are indicated by the end views thereof. As will be appreciated by those of ordinary skill in the art, the pulses 6′ and 4′ have been illustrated in FIG. 1D in a partially coincident relationship because it is generally preferred to apply a field transverse to the easy axis prior to the field applied in parallel therewith; however, as will be obvious to those of ordinary skill in the art, the complete coincidence of pulses 6′ and 4′ could be utilized as could neucleation techniques.

After the reversely oriented domain indicated by the vectors 16 in FIG. 1B has been established, the switch means 10C may be opened and the column pulse generator means 6 deenergized while the write-in of analog information into the analog memory apparatus depicted in FIG. 1 is initiated by the application of such analog signals to the input terminal 14 of the row pulse generator means 5, the closure of switch means 10B of the switching bank means 10 and the energization of the column pulse generator means 7. As was stated above, the row pulse generator means 5 may comprise analog to digital conversion means which acts to provide a plurality of digital pulses in response to the application of an analog signal thereto wherein the number of digital pulses produced is proportional to the analog signal applied. Accordingly, when the switch means 10B of the switching bank means 10 is closed and analog signals are applied to the input terminal 14 of the row pulse generator means 5, the repetitiously appearing current pulses 5′ illustrated in FIG. 1D will be applied to the row conductor 9. In addition, when the column pulse generator means 7 is energized, the read-write pulses 7′ indicated in FIG. 1D are applied to the second column conductor 12. The repetitiously appearing current pulses 5′ and the read-write pulses 7′ are each of insufficient magnitude and duration, as aforesaid, to individually establish a reversely oriented domain as was accomplished above, nor are they of sufficient magnitude and duration to individually produce the reduced level of magnetomotive force necessary to extend or further propagate the reversely oriented domain, indicated by the vectors 16 in FIG. 1B, previously formed. However, as read-write pulses 7′, indicated in FIG. 1D, apply a field to the magnetic memory element means 1 which is transverse to the easy axis and is of a sufficient magnitude to cause the domains linked thereby to temporarily shift their orientation from an alignment with the easy axis, indicated by the arrow E in FIG. 1A, toward an alignment with the hard axis, indicated by the arrow H in FIG. 1A, in accordance with the direction of the field applied, each read-write pulse 7′ applied to the second column conductor 12 will cause a temporary shift in the orientation of each of the domains linked thereby and accordingly the nondestructive readout thereof. Conversely, as the repetitiously appearing current pulses 5′ applied by row pulse generator means 5 produce a field parallel to the orientation of the magnetic domains present in the magnetic memory element means 1 and are of an insufficient magnitude and duration to accomplish a reversal thereof, the magnetic domains present therein are substantially unaffected by the field generated solely thereby. Therefore, while the read-write pulses 7′ applied by the column pulse generator means 7 acting as above will cause the nondestructive readout of the magnetic domains present in the portion of the magnetic memory element means 1 linked thereby without otherwise affecting such domains, the repetitiously appearing current pulse 5′ applied to the row conductor 9 will, when considered individually, have virtually no substantial effect on the domains present in the magnetic memory element means 1.

While the repetitiously appearing current pulses 5′ applied to row conductor 9 and the periodic read-write pulses 7′ applied to second column conductor 12 are of insufficient magnitude and duration to individually cause either new reversely oriented domains to be formed in the magnetic memory element means 1 or to cause the initially formed, reversely oriented domain 16 to be expanded, their combination is sufficient to cause the initially formed, reversely oriented domain 16 to expand under the influence of the fields coincidentally generated thereby. Furthermore, as it is well known to those of ordinary skill in the art that a magnetic domain once stably established may be expanded under the influence of a substantially smaller field than is required initially to establish it, the magnitude and duration of the current pulses 5′ and 7′ are selected to have a value such that their coincident application to the row conductor 9 and the second column conductor 12 will generate a field which is sufficient to incrementally expand a previously established domain but insufficient to establish new reversely oriented domains in the portion of the magnetic memory element means 1 subjected thereto. Accordingly, when a current pulse 5′ and a read-write pulse 7′ are coincidentally applied to the row conductor 9 and the second column conductor 12, respectively, the portions of the magnetic memory element means 1 linked by the field generated thereby will be subjected to a field which is sufficient to cause the previously established, reversely oriented domain 16 to expand; however, such fields will not be sufficient to cause the formation of new domains, having reverse orientation, in the portion of the magnetic memory element means 1 linked by such field. Thus, the coincident application of current pulses 5′ and 7′ to the row and second column conductors 9 and 12, respectively, acts only to expand the previously formed, reversely oriented magnetic domain 16 subjected to the fields generated by such coincident application.

As was stated above, the number of current pulses 5′ supplied by the row pulse generator means 5 to the row conductor 9, as indicated in FIG. 1D, is dependent upon the analog signal applied to the input terminal 14 thereof; however, the magnitude, duration and repetition rate of such pulses 5′ when they are applied to the row conductor 9 is fixed. Similarly, the read-write current pulses 7′ applied to the second column conductor 12 by the column generator means 7 will have a fixed magnitude, duration and repetition rate and, in addition thereto, are timed to coincide, as shown in FIG. 1D, with the repetitiously appearing current pulses 5′, if any, applied to the row conductor 9. Thus, when the switch means 10B is closed, analog signals are applied to the input terminal means 14 and the column pulse generator means 7 is energized; the portion of the magnetic memory element means 1 wound by the second column conductor 12 will be subjected to the periodic field generated by the read-write current pulses 7′ applied to the second column conductor 12 and the field generated by the current pulses 5′, applied to the row conductor 9, which is dependent upon the analog signal applied to the input terminal 14. Accordingly, when these conditions obtain, the portions of the magnetic memory element means 1 subject to a field applied by the second column conductor means 12 will have a periodic field applied thereto which is sufficient to extend a reversely established domain therein while the portions of the magnetic memory element means 1 external thereto will have only the field generated by the current pulses 5′ applied thereto which is not capable, for the reasons aforesaid, of affecting the condition of the magnetic domains established therein. Furthermore, since the periodic field applied to the portion of the magnetic memory element means 1 linked by the column conductor 12 is dependent upon the coincident application of the read-write current pulses 7′, which are continuously applied at a fixed frequency, and the current pulses 5′, which depend upon the analog signal applied to the input terminal means 14; the periodic field applied to such portion of the magnetic memory element means 1 will be proportional to the analog signal in the same manner as are the current pulses 5′. Therefore, it will be seen that the number of applications of the periodic domain extending field to the portion 1 linked by the second column conductor 12 will depend upon the analog signals applied to the input terminal 14 of the row pulse generator means 5 which provides current pulses 5′ in proportion thereto; and, in the absence of the provision of such current pulses 5′ only the field generated by the read-write pulses 7′ is applied thereto.

The coincident application of a current pulse 5′ and a read-write current pulse 7′ to the row conductor 9 and the second column conductor 12, respectively, will generate a field which causes the previously established reversely oriented domain 16 to expand in a manner which may best be appreciated in conjunction with a consideration of FIGS. 1B and 1C wherein FIG. 1B illustrates the initially formed but unexpanded reversely oriented domain 16 in conjunction with the portion of the magnetic memory element means 1 linked by the first and second column conductors 11 and 12 and FIG. 1C shows the same portion of the magnetic memory element means 1 when the initially established, reversely directed domain has been substantially expanded. As is illustrated in FIG. 1B, when oppositely directed domains such as 16 and 15 are present in magnetic material and subjected to a magnetic field which is properly directed and of sufficient magnetomotive force to expand domains having an orientation in a first direction such domains will expand by joining portions of the oppositely directed domains adjacent to their domains walls 16′ and 16″ thereto under the phenomenon known as "creep." This phenomenon manifests itself in that the portions of domains 15, having an opposite orientation to the easy axis component of the applied field, adjacent to the domain wall 16″ of the domain 16, having an orientation in the direction of the easy axis component of the field, are caused to rotate in the direction of the applied field while the remainder of such oppositely directed domains are only partially rotated away from their initial direction. Upon the termination of the applied field, the portions of said oppositely directed domains which rotated in the direction of the applied field, join with the domain 16 which was to be expanded whereupon the domain 16 to be expanded has been extended at the expense of the oppositely directed adjacent domain which has been reduced at the portions thereof adjacent to the domain walls thereof. Thus, the expansion of a previously established domain proceeds by the forward propagation of the domain wall 16″ intermediate the domains subjected to the applied field in increments which depend upon the magnitude of the field applied and the nature of the domain walls present. Therefore, as shown in FIG. 1B, since only the domain 16 and the domain 15 having the domain wall 16″ therebetween are subject to the field generated by the coincident application of a read-write current pulse 7′ to the second column conductor 12 and the current pulse 5′ to the row conductor 9, which field is directed to enlarge the growth of the previously established domain 16, the domain wall 16″ will propagate toward the right in an incremental manner with each coincident application of current pulses 7′ and 5′ while the domain wall 16′ will remain relatively stationary. The result of many such coincident applications of the current pulses 7′ and 5′ to the column and row conductors 12 and 9 is shown in FIG. 1C where the domain 16 is illustrated as enlarged to almost the entire portion of the magnetic memory element means 1 linked by the second column conductor 12.

Since, as was explained above, a domain extending field is only generated by the coincident application of a read-write current pulse 7′ to the second column conductor 12, which occurs at a fixed rate, and the application of current pulse 5′ to the row conductor 9, which depends upon the analog signal applied to input terminal 14; the degree of incremental extension of the initially established domain 16 will be a measure of the number of current pulses 5′ applied to the row conductor 9 and hence of the analog signals which have been applied to the input terminal 14. Therefore, such analog information as is applied to the input terminal 14 may be selectively stored in the analog memory apparatus according to the present invention. In addition, as the read-write current pulses 7′ applied to the second column conductor 12 will not individually produce a field which is sufficient to extend the initially established domain 16 but which is sufficient to produce a field which will nondestructively read out the domains linked thereby, the relationship between the size of the portions of the domains 15 and 16 linked by a field generated due to the second column conductor 12 will always be available as a readout signal. This may be seen if it is appreciated that a field produced by a read-write pulse 7′ applied to the second column conductor 12 will cause the domains influenced thereby to tend to align in the direction of the field which is here parallel to the hard axis, indicated by the arrow H, of the magnetic memory element means 1. However, as the domains 16 and 15 linked thereby are oppositely directed, their respective directions of rotation will be opposite and hence opposite readout signals will be induced in the row conductor 9, in the well-known manner, by the respective rotations thereof so that the magnitude of the resultant readout signal in the row conductor 9 is representative of the difference between the opposite polarity readout signals induced in the row conductor 9 and hence is a measure of the relationship between the size of the domains 15 and 16 linked by the field produced by the second column conductor 12. Thus, a readout signal which corresponds to the degree of extension of the initially established domain 16 is generated in the row conductor 9 each time a read-write current pulse 7′ is applied to the second column conductor 12 and this readout signal, i.e., the memory contents stored in memory element 1, is detected by the differential amplifier means 8, separated through the usual cancellation techniques from noise pulses and/or the current pulse 5′ used for extending the reversely oriented domain 16, therein and applied to the output terminals thereof.

The output of the differential amplifier means 8 for a typical cycle of operation is illustrated by waveform 8′ in FIG. 1D while the current pulses applied to the row conductor 9 and the first and second column conductors 11 and 12 in such typical cycle of operation are indicated by the waveforms 9′, 11′ and 12′, respectively. As may be seen from an inspection of FIG. 1D, after the magnetic memory element means 1 has been reset by the current pulses 3′ applied to the row conductor 9 and an oppositely directed domain 16 has been initially established by the coincident application of pulses 6′ and 4′ in the portion thereof linked by the first column conductor 11; read-write pulses 7′ are applied to the second column conductor 12 in coincidence with the current pulses 5′ which may be applied to the row conductor 9 and represent, by their number, the analog signal applied to the input terminal 14 of the row pulse generator means 5. At time $t_1$ when the first pair of read-write and current pulses 7′ and 5′ are applied to the second column conductor 12 and the row conductor 9, respectively, the initially established, reversely directed domain 16 will be unextended and hence the portion of the magnetic memory element means 1 linked by the second column conductor means 12 will be primarily occupied by the domain 15. Accordingly, the readout pulse 8″ received at time $t_1$ is a large positive pulse indicative of the magnetic domain conditions present in the portion of the magnetic memory element means 1 linked by the second column conductor 12. As additional pairs of current pulses 7′ and 5′ extend the initially established domain 16, the positive readout pulses 8′ decrease in magnitude in proportion to the relationship between the size of magnetic domains 16 and 15 linked by the second column conductor 12 until such time as the size of the domains 15 and 16 linked is approximately equal whereupon no output pulse 8′ is produced. Thereafter, as additional pairs of current pulses 7′ and 5′ are applied, the magnitude of the output pulses 8′ become increasingly negative and maximize in magnitude when the reversely directed domain 16 is extended to occupy the full length of the magnetic memory element 1 linked by the second column conductor 12. In addition, as may be seen from FIG. 1D, at the time points $t_2$, $t_3$, $t_4$, $t_5$ and $t_6$, when no current pulse 5′ is applied to the row conductor 9, nondestructive readout occurs in the absence of domain extension and hence the output pulses 8′ obtained are of the same magnitude as the preceding output pulse. Thus, it will be appreciated that the output of the embodiment of the analog storage apparatus illustrated in FIG. 1A is proportional to the analog signals applied thereto.

The embodiment of the analog storage apparatus shown in FIG. 1A is intended as exemplary of the concepts of the present invention and thus many modifications may be made thereto without deviating from the basic concepts employed. For instance, the output portion thereof could be provided with a level shift circuit so that the proportional output of the invention may be read directly. Furthermore, the first column conductor 11 may be located in the center of the second column conductor 8 whereby the initially established domain could be extended in both directions and/or resetting may be selectively accomplished by the use of the column driver means 7 in conjunction with the row driver means 3, whose output pulse magnitude would be modified for this type of resetting.

Another embodiment of the analog memory apparatus according to the present invention is illustrated in FIGS. 2A and 2B wherein FIG. 2A schematically shows this embodiment of the invention per se and FIG. 2B is representative of the manner in which a reversely oriented domain is formed therein. As the embodiment of this invention illustrated in FIGS. 2A and 2B, as well as those depicted in succeeding figures, employ a plurality of means whose structure and function are the same as those shown and explained above in conjunction with FIG. 1A, where appropriate, such means as common to a preceding figure have retained previously adapted reference numerals and will be described hereinafter by way of reference to the preceding figure in which they appear so that undue repetition is avoided.

The embodiment of the analog storage apparatus according to the present invention, as shown in FIG. 2A, comprises magnetic memory element means 1, nonmagnetic element means 2, row pulse generator means 17, column pulse generator means 18, differential amplifier means 8 and comparator means 19. The magnetic memory element means 1, the nonmagnetic element means 2 and the differential amplifier means 8 as shown in FIG. 2A may each take the same form, perform the same function and are operatively interconnected in the same manner as are their corresponding means shown and previously described above in conjunction with FIG. 1A. Similarly, the row pulse generator means 17 is coupled to the magnetic memory element means 1 and the nonmagnetic element means 2 through parallel portions of the row conductor 9. The row pulse generator means 17 illustrated in FIG. 2A comprises the reset pulse generator means 3, the set pulse generator means 4, means similar to the analog to digital converter means 5 and the switching bank means 10 illustrated in FIG. 1A and is shown in FIG. 2A as the single block 17 merely to simplify the showing therein. Accordingly, it will be seen that the row pulse generator means 17 performs the same circuit functions in substantially the same manner as the row pulse generator means 3—5 illustrated in FIG. 1A and hence requires no further reiteration in this portion of the specification except to not that, as shall be seen below, the analog to digital converter means present in the row pulse generator means 17 is here capable of providing opposite polarity digital pulses to the row conductor 9 in response to input signals applied thereto through conductor 14''.

The comparator means 19 may take any of the well-known forms of comparison devices which act to compare two input signals applied thereto and produce an output signal related to the difference therebetween. A first input to the comparator means 19 is connected through the conductor 20 to the output of the differential amplifier means 8 while a second input thereto at input terminal 14' is adapted to receive analog signals to be stored in the embodiment of the analog memory apparatus illustrated in FIG. 2A. The output of the comparator means 19 is connected through conductor 14'' to the input of the row pulse generator means 17 so that said comparator means 19 forms a feedback circuit for the analog memory apparatus depicted in FIG. 2A. This feedback circuit, as shall be seen below, ensures that the exemplary embodiment of the present invention depicted in FIG. 2A will manifest high accuracy in operation.

The embodiment of the analog memory apparatus illustrated in FIG. 2A is shown as including only a single column conductor 12 winding the magnetic memory element means 1 and the nonmagnetic element means 2. The column conductor 12 shown in FIG. 2A may take the same form as the second column conductor 12 shown in FIG. 1A and accordingly, the analog memory apparatus shown in FIG. 2A represents a substantial simplification over the embodiment of the invention illustrated in FIG. 1A as the first column conductor 7 shown therein together with the column pulse generator means 6 therefor has been omitted. The column conductor 12 shown in FIG. 2A is connected to the column pulse generator means 18. The column pulse generator means 18 may take a conventional form of column generator means which acts in the well-known manner to supply the read-write pulses 7' described in conjunction with FIG. 1D. Thus, as to this function, the column pulse generator means 18 may take the same form as the column pulse generator means 7 described above; however, in addition thereto, the column pulse generator means 18 shown in FIG. 2A acts to supply a domain establishing pulse, similar to pulse 6' shown in FIG. 1D, whenever the row pulse generator means 17 applies a set pulse to the row conductor 9.

As the operation of the analog memory apparatus shown in FIG. 2A is highly similar to that already set forth for the embodiment of the invention illustrated in FIG. 1A, the operation thereof will be briefly outlined in areas of similarity therebetween while a detailed description of such operation will be set out only in the areas of difference therebetween. Accordingly, in the operation of the analog memory apparatus depicted in FIG. 2A, the magnetic memory element means 1 is initially placed in a cleared state wherein all the domains therein have the same orientation by the application of a large reset pulse to the row conductor 9 by the row pulse generator means 17. This reset pulse may again be considered to be of negative polarity and otherwise take the form of the reset pulse 3' described above in conjunction with FIG. 1D. Thereafter, an oppositely directed domain is established in the portion of the magnetic memory element means 1, linked by the column conductor 12, by the application of a set pulse to the row conductor means 9 by the row pulse generator means 17 and the application of a pulse similar to the current pulse 6', previously described in conjunction with FIG. 1D, to the column conductor 12 by the column pulse generator means 18. However, as the first column conductor 11, illustrated in FIG. 1, has here been omitted, the reversely directed domain 16, as shown in FIG. 2B, may be here established at any arbitrary location within the portion of the magnetic memory element means 1 linked by the column conductor 12 rather than in a narrowly defined portion thereof linked by a special winding. Accordingly, as the reversely oriented domain 16, shown in FIG. 2B, may be formed at an arbitrary location within the portion of the magnetic memory element means 1 linked by the column conductor 12, there is a possibility that when such initially established domain is expanded, under the influence of read-write pulses supplied to the column conductor 12 by the column pulse generator means 18 and current pulses supplied to the row conductor 9 by the row pulse generator means 17, the requisite proportional relationship between the number of current pulses representing the analog signal as applied to the row conductor 9 and the output pulses from the differential amplifier means 8 will not be maintained because one or both of the domain walls 16' and 16'' may be involved in the expansion process with the domains 15 depending upon where the initially established domain 16 is formed in different cycles of operation. Therefore, the feedback loop formed by the comparator means 19 is provided in the embodiment of this invention illustrated in FIG. 2A.

After the reversely directed domain 16 has been established in a portion of the magnetic memory element means 1 linked by the column conductor 12, said reversely directed domain may be enlarged in the same manner described above with regard to the FIG. 1A embodiment of the present invention, by the coincident application of read-write current pulses to column conductor 12 by the column pulse generator means 18 and current pulses whose number is representative of the analog signal to be stored applied to the row conductor 9 by the row pulse generator means 17. In the embodiment of the invention illustrated in FIG. 2A, however, the analog signals to be stored are initially applied to input terminal 14' of the comparator means 19. The comparator means 19, acting in the well-known manner, compares the value of the analog signal to be stored as applied to input terminal 14' with the analog output of the differential amplifier means 8, applied thereto through conductor 20, and designates the polarity of the current pulse to be supplied to the row conductor 9 from the row pulse generator means 17 depending upon the polarity of the difference between the compared inputs thereto. Thus, the initially established and/or expanded domain may be further expanded or reduced depending upon the difference between the analog input supplied to the comparator means 19 and when such difference becomes zero or drops below a predetermined value, the current pulses supplied to the row conductor 9 will be terminated until the analog signal applied to terminal 14' is modified.

Accordingly, it will be seen that the analog signal written into the analog memory apparatus according to the embodiment of the invention illustrated in FIG. 2A is accurately stored therein and may be nondestructively read out whenever such information is desired by merely energizing the column pulse generator means 18. Furthermore, as will be obvious to those of ordinary skill in the art, although only one column conductor 12 was relied upon in the embodiment of the invention illustrated in FIG. 2A; should it be desired to establish a plurality of reversely directed magnetic domains in the magnetic memory element means 1, a plurality of column conductors 12 together with appropriate pulse generator means therefor may be utilized.

A further embodiment of the analog memory apparatus according to the present invention is shown in FIGS. 3A and 3B wherein FIG. 3A illustrates an exemplary embodiment of the analog memory apparatus according to the present invention in a learning circuit configuration while FIG. 3B represents the waveforms of current pulses applied to and derived from the embodiment of the invention shown in FIG. 3A. The embodiment of the present invention illustrated in FIG. 3A comprises magnetic memory element means 1, nonmagnetic element means 2, row pulse generator means 17, column pulse generator means 21 and 22, differential amplifier means 8, quantizing circuit means 23 and logic circuit means 24. The magnetic memory element means 1, the nonmagnetic element means 2 and the differential amplifier means 8 illustrated in FIG. 3A may each take the same form, perform the same function and are interconnected in the same manner as are the corresponding circuit means previously described above in conjunction with FIGS. 1A and 2A. Similarly, the row pulse generator means 17 is coupled to the magnetic memory element means 1 and the nonmagnetic element means 2 through parallel portions of the row conductor 9. The row pulse generator means 17 as illustrated in FIG. 3A may take the same basic form as the row pulse generator means 17 described in conjunction with FIG. 2A with the single exception that the analog to digital converter utilized therein has been here replaced with pulse generator means responsive to input pulses to provide output pulses on a one for one basis.

The quantizing circuit means 24 is connected to the output of the differential amplifier means 8, previously described above, and accordingly is adapted to receive output signals therefrom representative of the output of the magnetic memory element means 1 with the noise and drive pulses cancelled. The quantizing circuit means 23 acts in the well-known manner to discriminate the polarity of the short duration pulses applied thereto from the differential amplifier means 8 and produces in response thereto a +1 output when such pulses exceed a predetermined value, a −1 output when such pulses are below a predetermined negative value and in all other cases produces a zero (0) output. Although the precise form of the quantizing circuit means 23 forms no part of the present invention as set forth, the quantizing circuit means 23 may be considered to take the form of a signal detector circuit, a strobe circuit and a flip-flop, which have not been shown herein. The output of the quantizing circuit means 23 is coupled to one input of the logic circuit means 24 through the conductor 27. The logic circuit means 24 may here take the form of conventional comparator means which acts in the well-known manner to compare in a digital fashion the input signals applied thereto through conductor 27 and the external input terminal 26 and to provide a pulse output upon the detection of a difference therebetween whose polarity is representative of such difference. The output of the logic circuit means 24 which takes the form of pulses 24', illustrated in FIG. 3B, is applied to the input of the row pulse generator means 17 through the conductor 25.

The magnetic memory element means 1 and the nonmagnetic element means 2 are each wound in the column direction by a plurality of individual column conductors $12_1$—$12_N$. Each of the column conductors $12_2$—$12_N$ is individually connected to the column pulse generator means 22 annotated "Pattern Input" in FIG. 3A. The pulse generator means 22 may take the form of N−1 pulse generator means of the form described in conjunction with the column pulse generator means 18 of FIG. 2A wherein each of said N−1 pulse generator means is associated with one of the column conductors $12_2$—$12_N$. However, in addition thereto, each of such N−1 pulse generator means present in the column pulse generator means 22 is adapted to receive at a gated input thereto $29_2$—$29_N$, respectively, a binary input in the form of a 1 or 0. The N−1 pulse generator means present in the column pulse generator means 22 and associated with gated inputs $29_2$—$29_N$, respectively, are adapted to provide a read-write pulse 12'', illustrated in FIG. 3B, whenever the binary input supplied to the gated input thereto $29_2$—$29_N$, respectively, comprises a 1; however, when such input comprises a 0, no read-write pulse 12'' is produced and applied to the column conductor $12_2$—$12_N$ associated therewith. Accordingly, it will be seen that the gated inputs 29, taken as a whole, may thus accept a pattern comprising a digital input group made up of 1 and 0 which may represent figures, characters, etc., and depending upon whether or not a 1 is applied to the gated input $29_2$—$29_N$ associated with a given column conductor $12_2$—$12_N$, respectively, a read-write pulse 12'', shown in FIG. 3B, will be applied or not applied thereto. The column conductor $12_1$ is connected to the column pulse generator means 21 which may also take the form of the column pulse generator means 18 described in conjunction with FIG. 2A. The pulse generator means 21 also has a gated input associated therewith, not shown herein; however, as the gated input to the pulse generator means 21 always has a 1 input applied thereto each time a pattern or input group is applied to inputs 29, the column pulse generator means 21 will apply a read-write pulse 12'', shown in FIG. 3B, to the column conductor $12_1$ each time read-write pulses 12'' are applied by the column pulse generator means 22 to any of the column conductors $12_2$—$12_N$.

In the operation of the instant embodiment of the analog memory apparatus in the learning circuit configuration illustrated in FIG. 3A, the magnetic memory element means 1 is initially cleared by a reset pulse and thereafter a reversely directed domain is established therein at the portions thereof intersected by the column conductor $12_1$ and the column conductors $12_2$—$12_N$ having 1 bits applied to the gated inputs thereto. As the foregoing takes place in precisely the same manner as was described in conjunction with FIG. 2A for a single reversely oriented domain, the manner in which the same operation occurs for the initial formation of multiple domains will not be here reiterated. Accordingly, with a stable, reversely oriented domain established in the magnetic memory element means 1 at the intersection of the column conductor $12_1$ and the requisite ones of column conductors $12_2$—$12_N$ therewith, the magnetic memory element means 1 has written therein an analogously stored weight or load coefficient for the column conductor $12_1$ and the appropriate ones of column conductors $12_2$ —$12_N$. The weight or load coefficients thus stored at the intersections of the requisite ones of the column conductors $12_2$—$12_N$, as shall be seen hereinafter, represents one weight or load coefficient for each of the bits of the input group or pattern to be recognized while the weight or load coefficient located at the intersection of the magnetic memory element means 1 with the column conductor $12_1$ represents a threshold value with respect to the sum of the loads. This threshold value is determined by the statistical probability of the occurrence of an identity between the external input applied to the input terminal 26 of the logic circuit means 24 and the output signal obtained from the quantizing circuit means 23 due to the application of the input signal group or pattern to be recognized to the gated inputs 29.

After the weights or load coefficients have been thus stored in the magnetic memory element means 1, the analog memory means 1 depicted in FIG. 3A is ready to undergo a training or education process whereupon the output thereof due to the application of a specific input group or pattern to be recognized is made to conform to a selected output signal applied to the input terminal 26 of the logic circuit means 24. Accordingly, the input group or pattern to be recognized is periodically applied during the training process to the gated inputs $29_2$—$29_N$ and the selected output represented by the pulses 26', as shown in FIG. 3B, is applied to the input terminal 26 of the logic circuit means 24. The training process of the embodiment of this invention may be best understood by reference to FIG. 3B in conjunction with FIG. 3A.

Each time the input group or pattern to be recognized is applied to gated inputs $29_2$—$29_N$, the column conductor $12_1$ and each of the column conductors $12_2$—$12_N$ whose associated gated input $29_2$—$29_N$, respectively, have a 1 bit applied will have a pulse 12'', as shown in FIG. 3B, applied thereto from the column pulse generator means 21 and 22. The pulses 12″ applied respectively to the column conductor $12_1$ and the requisite ones of the column conductors $12_2$—$12_N$ whose gated inputs $29_2$—$29_N$, respectively, have 1's applied thereto will read out, in the manner described above, the portions of the magnetic memory element means 1 linked thereby and accordingly, the sum of the weights stored in the magnetic memory element means 1 together with the threshold value will be produced at the output of the differential amplifier means 8 in the previously described manner as the narrow pulse8‴ shown in FIG. 3B. The output of the differential amplifier means 8 is applied to the quantizing circuit means 23 which, in response thereto produces as aforesaid, either a +1, a 0, or a −1 output, as shown by pulses 23′, depending on the value of the output of the differential amplifier means 8. The output of the quantizing circuit means 23 is applied over conductor 27 to one input of the logic circuit means 24. In addition, the logic circuit means 24 has pulses 26′, as shown in FIG. 3B, periodically applied thereto which pulses 26′ are representative of the desired output of quantizing circuit means 23. The logic circuit means 24 acts in the well-known manner to compare the pulses applied thereto by conductor 27 and input terminal 26 as a result of such comparison produces an output in the form of pulses 24′, shown in FIG. 3B, corresponding to the polarity of the difference therebetween. Thus, the actual output of the quantizing circuit means 23 and the desired output, as applied to the input terminal 26, are compared and digital pulses whose polarity is representative of the difference therebetween are produced by the logic circuit means 24 and applied through conductor 25 to the input of the row pulse generator means 17. The row pulse generator means 17, in response to each pulse 24′ applied thereto by the logic circuit means 24 will produce a current pulse 17′, as shown in FIG. 3B, which acts in combination with pulses coincidentally applied on the requisite ones of the row conductors $12_1$—$12_N$ to expand or reduce the domains linked thereby and hence charge the output of the quantizing circuit means in a stepwise manner. Accordingly, this operation will be repeated until the actual output of the quantizing circuit means 23 equals the desired output as applied to the input terminal 26, whereupon said desired output will be nondestructively read out of the magnetic memory element means 1 each time the selected input group or pattern to be recognized is applied thereto. The desired output, however, will not be produced, for any other input group or pattern to be recognized which is applied to gated inputs 29. Therefore, the training process has been performed so that only a select input group will be distinguished and hence the desired output is obtained only for the particular pattern to be recognized. Thus, it is possible to separate input groups into two categories in response to a requirement therefor.

A typical training or education cycle is illustrated in FIG. 3B and may be considered to render apparent the training operation outlined above. As shown in FIG. 3B, at time $t_1$, a pulse 12″ is applied to the column conductor $12_1$ and each of the column conductors $12_2$—$12_N$ whose gated inputs $29_2$—$29_N$, respectively, have 1 bits of the input group applied thereto. Accordingly, the sums of the weights and the threshold value is read out of the magnetic memory element means 1, in the manner described above, and appears at the output of the differential amplifier means as pulse 8‴. The output of the differential amplifier means 8 is discriminated by said quantizing circuit means 23 which here produces a +1 pulse 23′ in response thereto and applies such +1 pulse to one input of the logic circuit means 24. The logic circuit means 24 has applied thereto, at input 26, a pulse 26′ representative of the output desired from the quantizing circuit means 23 and, accordingly, compares the output of the quantizing circuit means 23 with the input applied to terminal 26, as aforesaid. The output 24′ of the logic circuit 24, which here represents the polarity of the difference between pulses 23′ and 26′, is applied to the input of the row pulse generator means 17 through the conductor 25. The row pulse generator means 17 in response to a pulse having the polarity of the pulse 24′, here applied thereto, produces the pulse 17′ and applies the same to the row conductor 9 whereupon each of the domains linked by the column conductors $12_1$—$12_N$ having pulses 12″ applied thereto will be incrementally enlarged. Therefore, in the subsequent cycle of training, which takes place at time $t_2$, the output of the differential amplifier means is reduced, as shown by pulse 8‴, and the training cycle is repeated whereby at time $t_3$ the output of the differential amplifier means 8 is further reduced. The foregoing training operation is continually repeated until time $t_4$ is reached whereat the output 8‴ of the differential amplifier means 8 is below the predetermined level for which the quantizing circuit means 23 produces the desired output which is here shown as the −1 pulse 23′. Thereafter, the logic circuit means 24 produces no further output pulses and the training of the learning circuit configuration illustrated in FIG. 3A is completed. Thus, it will be seen that the embodiment of the analog memory apparatus illustrated in FIG. 3A may be rapidly trained and responds at high speed.

Thus, it will be seen that the analog memory apparatus according to the present invention achieves nondestructive readout, high switching speeds and manifests low drive power requirements because domain switching principles in thin film memory means are employed. Furthermore, because of the simplified wiring techniques employed, the manner in which thin film devices may be fabricated and the small size of thin film memory devices, high density arrays of the analog memory apparatus according to the present invention may be inexpensively manufactured.

Although the analog memory apparatus according to the present invention has been disclosed in conjunction with the several exemplary embodiments thereof, set forth herein, many modifications and alterations will be obvious to those of ordinary skill in the art. For instance, in the FIG. 3A embodiment of the present invention, an integrated value form of detection could be used in place of the peak detection technique described and domains could have initially been established at the intersection of the magnetic memory element means with all of the column conductors rather than the selective technique set forth. In addition, the elementary forms of the analog memory apparatus embodied herein readily admit of combination into high density storage arrays and matrices.

While the invention has been described in connection with several exemplary embodiments thereof, it will be understood that many modifications will be readily apparent to those of ordinary skill in the art; and that this application is intended to cover any adaptations or variations thereof.

What we claim is:

1. Magnetic memory apparatus, comprising:

an anisotropic thin film memory element;

means for establishing a first magnetic domain in said element disposed along a lengthwise axis thereof in a given orientation;

means for establishing a second magnetic domain in said element disposed along said lengthwise axis thereof and separated from said first domain by two spaced domain walls in an orientation reverse of said given orientation; and means activating said element with a number of bit pulses representing a predetermined input signal for moving one of said domain walls to expand said second domain in an amount proportional to said number of bit pulses and simultaneously therewith to contract said first domain by a corresponding amount to store said input signal in said element as a measure of the difference between said expanded second domain and said contracted first domain.

2. The memory apparatus according to claim 1 in which said first domain establishing means includes a generator for applying an electric pulse of preselected polarity to an input end of said element to establish said first domain therein in said given orientation of a downward direction normal to said element lengthwise axis.

3. The memory apparatus according to claim 1 in which said second domain establishing means includes:

a first generator for applying an electric pulse having a preselected polarity to an input end of said element;

an electric conductor wound in one turn on said element in a direction transverse to a lengthwise axis thereof; and a second generator for applying another electric pulse to said conductor in polarity and time coincidence with said last-mentioned pulse.

4. The memory apparatus according to claim 1 in which said activating means includes:

a source of said bit pulses having a preselected polarity and connected to an input end of said element;

an electric conductor wound in a plurality of turns on said element in a direction transverse to a lengthwise axis thereof; and a generator for applying to the conductor a train of write-in pulses coincident in time and polarity with said bit pulses.

5. The memory apparatus according to claim 1 in which:

said first domain establishing means includes a first generator for applying one electric pulse of preselected polarity to an input end of said element;

said second domain establishing means includes:

a second generator for applying another electric pulse having a polarity opposite to said one pulse preselected polarity to said element input end;

a first electric conductor wound in at least one turn on said element in a direction transverse to a lengthwise axis thereof; and a third generator applying a further electric pulse to said first conductor in time and polarity coincidence with said another pulse while said one pulse is absent from said element input end;

and said activating means includes:

a source of a train of bit pulses having said another pulse polarity and applied to said element input end while said one and another pulses are absent therefrom and said further pulse is absent from said first conductor;

a second conductor wound in a plurality of turns on said element in said axis transverse direction thereof in an area proximate to said first conductor and extending on said element in a direction away from said element input end;

coincidence a fourth generator for supplying a train of write-in pulses to said second conductor in time and polarity coincidence with said bit pulses.

6. The memory apparatus according to claim 1 which includes:

readout means responsive to said write-in pulses to read out said difference between said expanded second domain and said contracted first domain as an output signal representing said input signal; and feedback means comparing the magnitudes of said input and output signals for producing a difference output signal of particular polarity to additionally activate said element to correspondingly vary said expanded second domain and said contracted first domain by moving said one wall in opposite directions to compensate for variations in the magnitude of said input signal.

7. The memory apparatus according to claim 1 which includes readout means connected to an output end of said element and responsive to said write-in pulses to read out said difference between said second domain expanded quantity and said first domain contracted quantity stored in said element as an output signal representing said input analog signal.

8. The memory apparatus according to claim 7 in which said signal readout from said elongated magnetic element is subject to a noise signal induced therein, and said apparatus includes an elongated nonmagnetic element connected in parallel with said elongated magnetic element between said input and output ends thereof and subject to the same noise causing said induced noise signal in said magnetic element so that a corresponding noise signal is also induced in said nonmagnetic element as said magnetic and nonmagnetic elements have substantially identical electrical characteristics, whereby said readout means utilizes said noise signal readout from said nonmagnetic element to cancel in said output signal said noise signal readout from said magnetic element.

9. The memory apparatus according to claim 1 in which said second domain establishing means includes: means for applying one electric pulse of preselected polarity to an input end of said element; and an electric conductor wound in a plurality of turns on said element in a direction transverse to a lengthwise axis thereof; and said activating means applies a further electric pulse in polarity and time coincidence with said one pulse to said conductor for establishing said second magnetic domains in said first element.

10. The memory apparatus according to claim 9 in which said activating means includes: means for applying said bit pulses having said one pulse preselected polarity to an input end of said element while said one and further pulses are withheld and also for applying write-in pulses to said conductor in polarity and time coincidence with said bit pulse.

11. The memory apparatus according to claim 1 in which said predetermined input signal is an analog signal, and said number of bit pulses represents the magnitude of said analog signal.

12. The memory apparatus according to claim 1 in which:

said second establishing means includes:

a first generator for applying a first electric pulse of preselected polarity to an input end of said element;

a plurality of electric conductors, each wound on said element in a single turn in a direction transverse to a lengthwise axis of said element; said conductors spaced along said element lengthwise axis;

a second generator applying a second electric pulse in time and polarity coincidence with said first pulse to one of said conductors adjacent to said input end of said element for establishing therein one second magnetic domain within said two spaced domain walls proximate to said one conductor and oriented in a direction reverse to said first domain given direction;

circuit means applying a preselected pattern of "1" and "0" bits in time and polarity coincidence with said second pulse to the remaining conductors of said plurality thereof for establishing in said element additional second magnetic domains, each separated from said first domain by two spaced domain walls, oriented in the direction reverse to said first domain given direction and proximate to said respective remaining conductors having "1" bits applied thereto to write said preselected pattern in said element as a measure of the difference between the quantities of said first domain and said one and additional second domains; and means utilizing successively different random patterns of "1" and "0" bits, one latter pattern at a time, for activating said element to vary said first domain and said one and additional second domains to write said successive random patterns in turn in said element as a measure of the difference between said first domain and said one and additional second domains until said preselected pattern and one of said random patterns written in said element are identical as measured by the difference between the quantities of said first domain and said one and additional second domains due to said preselected pattern which latter difference is zero.

13. The memory apparatus according to claim 12 which includes:

differential circuit means activated by said random patterns stored in turn in said element for producing an output pulse having a magnitude to represent said last-mentioned patterns stored in turn in said element;

quantizing circuit means responsive to said differential means output pulse for producing an output pulse having a (+) polarity and representing one of said random patterns stored in said element;

logic means comparing in a digital manner said quantizing means (+) polarity output pulses and said random pattern pulses having a (−) polarity in turn and representing the polarity desired for said quantizing means output pulse for providing an output pulse having a (+) polarity to represent the difference between said quantizing and random pulses; and another generator energized by said logic means (+) output pulse for producing an output pulse to activate said element to expand said second domains at said one and additional conductors having "1" bits applied thereto and to contract said first domains in proximity thereof to cause said differential means to reduce the magnitude of said output pulse thereof to provide said quantizing means with said desired (−) polarity until said preselected pattern and said one random pattern written in said element are identical.

14. Magnetic memory apparatus, comprising:

an anisotropic thin film magnetic memory element;

means for producing a reset pulse;

means for producing a set pulse;

means for producing a train of bit pulses;

switching means operable for selectively connecting said set, reset and bit pulse means in turn to an input end of said element; said switching means initially operated for connecting said reset means to said element input end to apply thereto a reset pulse having a preselected polarity to establish in said element a first magnetic domain oriented in a given direction along a lengthwise axis of said element while said set and bit pulse means are disconnected therefrom;

a first electric conductor wound in one turn on said element in a direction transverse to said element lengthwise axis;

means for intermittently applying a further pulse to said first conductor; said switching means further operated for connecting said set pulse means to said element input end while said reset and bit pulse means are disconnected therefrom to apply to said element input end a set pulse having a polarity opposite to said reset pulse preselected polarity while said further pulse means applies a further pulse in time and polarity coincidence with said set pulse to said first conductor to establish in said element on a lengthwise axis thereof a second magnetic domain separated from said first domain by two spaced domain walls and oriented in a direction reverse to said first domain given direction;

a second electric conductor wound on said element in a plurality of turns substantially parallel with said first conductor turn and spaced along said element lengthwise axis; and means applying a train of write-in pulses having a polarity opposite to said reset pulse preselected polarity to said second conductor while said further pulse means withholds said further pulse from said first conductor and said switching means is additionally operated to disconnect said reset and set pulse means from said element input end and to connect said bit pulse means thereto so that said bit pulse means activated by an input analog signal applies a train of bit pulses coincident in time and polarity with said write-in pulses and including a number proportional to the magnitude of said input analog signal to expand said second domain and to contract said first domain in corresponding amounts by moving one of said domain walls to store said analog signal in said element as a measure of the difference between said first domain as contracted in amount and said second domain as expanded in amount.

15. Magnetic memory apparatus, comprising:

an elongated magnetic memory element;

first means for selectively applying a reset pulse, a set pulse and a train of bit pulses in turn to an input end of said element; said reset pulse having a preselected polarity and said set and bit pulses having a polarity opposite to said reset pulse preselected polarity; said means initially applying said reset pulse to said element input end while withholding said set and bit pulses therefrom to establish in said element a first magnetic domain oriented in a given direction along a lengthwise axis of said element;

an electric conductor wound on said element in a plurality of turns spaced in direction transverse to a lengthwise axis of said element;

second means for selectively applying a further pulse and a train of write-in pulses in turn to said conductor; said further pulse and said write-in pulses having a polarity opposite to said reset pulse preselected polarity; said first means selectively applying said set pulse to said element input end while withholding said reset and bit pulses therefrom and said second means selectively applying said further pulse to said conductor in time and polarity coincidence with said set pulse while withholding said write-in pulses therefrom for establishing in said element a second magnetic domain separated from said first domain by two spaced domain walls and oriented on a lengthwise axis of said element in a direction reverse to said first domain given direction; said second means next selectively applying said write-in pulses to said conductor while withholding said further pulse therefrom and while said first means withholds said reset and set pulses from said element input end and at the same time connects to said element input end a generator of a train of bit pulses having polarity and time coincidence with said write-in pulses; whereby said generator activated by an analog input signal supplies said bit pulse train to said element input end in a number proportional to the magnitude of said analog signal to expand said second domain and to contract said first domain in corresponding amounts by moving one of said domain walls to store said analog signal in said element as a measure of the difference between the amounts of said first domain as contracted and said second domain as expanded.

16. The memory apparatus according to claim 15 which includes feedback means responsive to the difference amount between said first domain as contracted and said second domain as expanded to store said input analog signal in said element and to the magnitude of said input analog signal for producing a difference feedback signal of particular polarity to additionally activate said bit generator to additionally control said number of said bits supplied to said element input end and thereby additionally to activate said element to vary said contracted first domain and said expanded second domain in corresponding opposite amounts to compensate for variations in the magnitude of said input analog signal.

17. Magnetic memory apparatus, comprising:

an elongated magnetic memory element;

first means for selectively applying a reset pulse, a set pulse and another pulse in turn to an input end of said element; said reset pulse having a preselected polarity and said set and another pulses having a polarity opposite to said reset pulse preselected polarity; said means applying said reset pulse to said element input end while withholding said set and another pulses therefrom for establishing a first magnetic domain in said element to extend lengthwise thereof in a given orientation;

a first electric conductor wound in one turn on said element in a direction transverse to a lengthwise axis thereof;

second means for intermittently applying a further pulse to said first conductor; said first means applying said set pulse to said element input end while withholding said reset and another pulses therefrom and said second means applying said further pulse to said first conductor in polarity and time coincidence with said set pulse for establishing one second magnetic domain separated by two spaced domain walls from said first domain in said element in proximity of said first conductor to extend lengthwise of said element in an orientation reverse to said first domain given orientation;

a plurality of second electric conductors, each wound on said element in a single turn substantially in a direction parallel with said first conductor direction; said second conductors spaced along said element lengthwise axis;

circuit means applying a preassigned pattern of "1" and "0" bits to said second conductors in polarity and time coincidence with said further pulse for establishing in said element additional discrete second magnetic domains, each separated from said first domain by two spaced domain walls, proximate to said respective second conductors and having said reverse orientation as spaced from each other and from said one second domain along said element lengthwise axis; whereby said preassigned bit pattern stored in said element is a measure of the difference between the magnitudes of said first and second domains therein; and means responsive to the difference between the magnitudes of said first and second domains in said element and to successively different patterns of "1" and "0" bits for providing successive output pulses of particular polarity to activate said first means to supply said another pulses one at a time in response to each of said last-mentioned bits in turn to vary the magnitudes of said first and second domains in opposite senses to write said successive different bit pattern in said element until one of said last-mentioned patterns is identical with said preassigned pattern; whereby said first and second domains established in said element for one different pattern is identical with said first and second domains established in said element for said preassigned pattern.